United States Patent
Korngut et al.

(10) Patent No.: US 7,586,959 B2
(45) Date of Patent: Sep. 8, 2009

(54) SPECKLE REDUCTION WITH TRANSPARENT BLOCKS

(75) Inventors: Doron Korngut, Modiin (IL); Avishay Guetta, Rehovot (IL)

(73) Assignee: Applied Materials, Israel, Ltd., Rehovot (IL)

( * ) Notice: Subject to any disclaimer, the term of this patent is extended or adjusted under 35 U.S.C. 154(b) by 454 days.

(21) Appl. No.: 11/236,355

(22) Filed: Sep. 26, 2005

(65) Prior Publication Data

US 2006/0066870 A1 Mar. 30, 2006

Related U.S. Application Data

(60) Provisional application No. 60/613,894, filed on Sep. 27, 2004.

(51) Int. Cl.
G02B 27/48 (2006.01)
(52) U.S. Cl. ........................................................ 372/25
(58) Field of Classification Search ........................ None
See application file for complete search history.

(56) References Cited

U.S. PATENT DOCUMENTS

| | | | |
|---|---|---|---|
| 4,521,075 A * | 6/1985 | Obenschain et al. | 359/569 |
| 4,619,508 A * | 10/1986 | Shibuya et al. | 353/122 |
| 5,040,872 A * | 8/1991 | Steinle | 359/638 |
| 6,169,634 B1 * | 1/2001 | Sirat | 359/641 |
| 6,367,935 B1 | 4/2002 | Wang et al. | |
| 6,577,429 B1 | 6/2003 | Kurtz et al. | |
| 6,798,505 B2 | 9/2004 | Karpol et al. | |
| 6,830,189 B2 | 12/2004 | Tsikos et al. | |
| 6,947,220 B1 * | 9/2005 | Soskind | 359/641 |
| 2003/0123159 A1 * | 7/2003 | Morita et al. | 359/742 |
| 2005/0264797 A1 * | 12/2005 | Nakano et al. | 356/237.2 |
| 2006/0163503 A1 * | 7/2006 | Urano et al. | 250/559.42 |

(Continued)

FOREIGN PATENT DOCUMENTS

EP 1521110 A * 4/2005

(Continued)

OTHER PUBLICATIONS

Korngut et al, U.S. Appl. No. 60/613,894, filed Sep. 27, 2004, entitled: "Speckle Reduction with Glass Made Stairs", 8pp.

Primary Examiner—Alessandro Amari
Assistant Examiner—Mark Consilvio
(74) Attorney, Agent, or Firm—Tarek N. Fahmi (57) ABSTRACT

Apparatus for reducing speckle, including a first coherence-reducing component, having a first array of transparent first elements arranged to receive different, respective first portions of a collimated light beam that is incident on the first component, the first elements generating different, respective optical lengths with respect to the light beam passing therethrough and outputting the respective first portions as respective first collimated sub-beams. The apparatus further includes a second coherence-reducing component, having a second array of transparent second elements arranged to receive different, respective second portions of each of the first collimated sub-beams of the light beam, the second elements generating different, respective optical lengths with respect to the light beam passing therethrough and outputting the respective second portions as respective second collimated sub-beams. The apparatus also includes a light combiner, which is arranged to combine the second collimated sub-beams into a collimated output beam.

54 Claims, 6 Drawing Sheets

U.S. PATENT DOCUMENTS

2007/0070302 A1 * 3/2007 Govorkov et al. ............. 353/94

FOREIGN PATENT DOCUMENTS

| EP | 1521110 A1 | * | 4/2005 |
| EP | 1521111 A1 | * | 4/2005 |
| JP | 02098919 A | * | 4/1990 |
| JP | 07335523 A | * | 12/1995 |
| JP | 2003031872 A | * | 1/2003 |
| JP | 2003167213 A | * | 6/2003 |
| JP | 2006323104 A | * | 11/2006 |
| WO | WO 03029875 A2 | * | 4/2003 |

* cited by examiner

SPECKLE REDUCTION WITH TRANSPARENT BLOCKS

CROSS-REFERENCE TO RELATED APPLICATIONS

This application claims the benefit of U.S. Provisional Patent Application 60/613,894, filed Sep. 27, 2004, which is incorporated herein by reference.

FIELD OF THE INVENTION

The present invention relates generally to coherent radiation sources, and specifically to reduction of speckle caused by the sources.

BACKGROUND OF THE INVENTION

Coherent light scattered by reflection or transmission from a rough surface forms an interference pattern in the space away from the rough surface. On viewing the pattern, an eye sees dark and light in a granular pattern, which is the speckle. An intensity detector of an optical system will also detect the speckle, and a measure of the speckle, termed its contrast, is typically a function of the ratio of the root mean square of the intensity fluctuation to the mean intensity. The varying intensity caused by the speckle may impact unfavorably on measurements made with coherent sources such as lasers, necessitating reduction or elimination of the speckle.

U.S. Pat. No. 6,367,935 to Wang, et al., whose disclosure is incorporated herein by reference, describes a system for eliminating image speckle in a scanning laser projector. A phase hologram divides an illumination beam of the projector into partial beams. The partial beams each illuminate part of a screen area, and generate speckle patterns which are moved. The different patterns are combined so as to average the intensities, the averaging removing the speckle.

U.S. Pat. No. 6,577,429 to Kurtz, et al., whose disclosure is incorporated herein by reference, describes a laser projection display system. The system includes an electrically controllable de-speckling modulator, which reduces the speckle by providing local random phase changes for incident light in the system.

U.S. Pat. No. 6,798,505 to Karpol, et al., whose disclosure is incorporated herein by reference, describes a system for article inspection including a method for reducing speckle occurring during the inspection. An optical fiber bundle is placed in the path of a coherent light beam, and the bundle outputs multiple divergent beams having reduced coherence.

U.S. Pat. No. 6,830,189 to Tsikos, et al., whose disclosure is incorporated herein by reference, describes illumination of objects with planar laser beams. A high resolution control system modifies the phase of the wavefront of a coherent beam. The beam then produces numerous speckle patterns, which can be spatially and/or temporally averaged to reduce the observed speckle.

U.S. Pat. No. 6,169,634 to Sirat, whose disclosure is incorporated herein by reference, describes a system for converting a collimated coherent light beam into an incoherent beam. Different portions of the beam are delayed by different amounts by passage through different cells of an optical element. The different delays introduced by the optical element exceed a coherence length of the beam.

SUMMARY OF THE INVENTION

In an embodiment of the present invention, an apparatus for reducing speckle comprises first and second coherence-reducing components arranged in series. The first component comprises a first array of transparent first elements. The first elements receive different respective first portions of a light beam incident on the first component, cause the first portions to traverse at least two different optical lengths generated by the first elements, and output the first portions as respective first substantially collimated sub-beams. Typically the incident light beam is substantially coherent, which is reduced by the apparatus.

Each of the first sub-beams is incident on the second coherence-reducing component, which comprises a second array of transparent second elements. The second elements receive different respective second portions of each of the first sub-beams, cause the second portions to traverse at least two different optical lengths generated by the second elements, and output the second portions as respective second substantially collimated sub-beams. Arranging the two components in series multiplies the coherence-reducing effect of the components, and so significantly reduces the coherence level of the light output from the second component, compared to the coherence level of light entering the first component.

A light combiner may be provided to combine the second sub-beams and output the combination as one, typically collimated, output beam. By combining a number of sub-beams which have traversed different optical lengths, the apparatus further reduces the coherence level of the output beam compared to that of the input beam, and so reduces the effect of speckle.

The incident coherent beam is typically generated by a single or multi-mode laser. In the latter case, a diffuser may be positioned between the laser and the elements to ensure that all the transverse modes are incident on all the elements of the first coherence-reducing component.

Typically, the light beam has a coherence length, and the optical lengths generated by the first and second arrays are selected so that each of the second sub-beams is at least partially incoherent with respect to the other second sub-beams. In some embodiments, the optical lengths generated by the first array, and/or the optical lengths generated by the second array, differ by a factor equal to or greater than the coherence length, so that each of the second sub-beams is incoherent with respect to the other second sub-beams.

In one embodiment, the transparent elements are formed as box-shaped blocks of the same material. The blocks typically have different lengths and substantially similar cross-sectional dimensions.

In embodiments of the present invention:
By placing the coherence-reducing components in series, a large number of differently delayed sub-beams are generated by a small number of elements having different optical lengths.
Beam collimation and polarization direction are preserved.
There is very low energy loss, and consequently substantially no damage to apparatus components.
The apparatus design is simple and there is substantially no need for optical alignment.

BRIEF DESCRIPTION OF THE DRAWINGS

The present invention will be more fully understood from the following detailed description of the embodiments thereof, taken together with the drawings, a brief description of which follows.

DETAILED DESCRIPTION OF EMBODIMENTS

Figure 1:
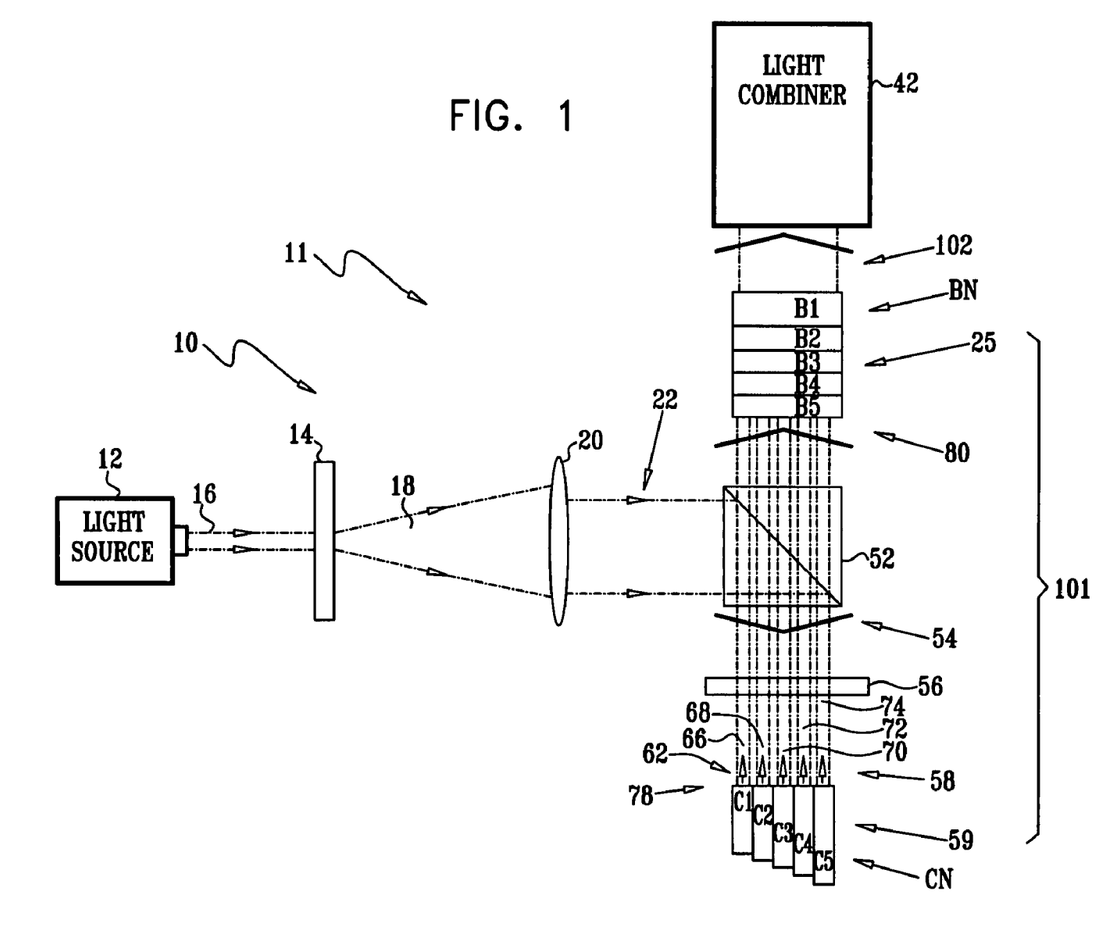
FIG. 1 is a schematic diagram of an initial section of a speckle reduction apparatus, according to an embodiment of the present invention.

Reference is now made to FIG. 1, which is a schematic diagram of an initial section 10 of a speckle reduction apparatus 11, according to an embodiment of the present invention. A light source 12, such as a laser, emits a substantially coherent light beam 16; as is explained herein, apparatus 11 reduces the coherence level of the light. Depending on the source, light beam 16 may comprise a plurality of modes, i.e., the beam may be a multi-mode beam, or alternatively, beam 16 may be a single mode beam. Except where otherwise stated, by way of example beam 16 is herein assumed to be a multi-mode beam generated by multi-mode source 12. Beam 16 has a coherence length $c_L$, which also depends on source 12, and which by way of example is assumed to be approximately 1 mm. Those skilled in the art will be able to adapt the following description, *mutatis mutandis*, for beams having values of $c_L$ different from 1 mm, and/or for single mode sources and beams.

A diffuser 14 diffuses beam 16, ensuring that each of the plurality of modes incident on the diffuser is generally uniformly spread out over a far field plane of the diffuser. Advantageously, diffuser 14 is a "top hat" diffractive diffuser, having a relatively even intensity spread between boundaries of diverging beam 18, the intensity falling off sharply beyond the boundaries. A suitable diffuser is an Aurora™ top-hat diffuser produced by Digital Optics Corporation, Charlotte, N.C. Typically, diffuser 14 has a high transmission, so that the light flux lost by beam 16 being converted to beam 18 is minimized. In some embodiments, diffuser 14 comprises a holographic diffuser. Typically, in a single mode system, diffuser 14 may be replaced by a diverging lens.

In one embodiment of the present invention, beam 16 has a diameter of approximately 4 mm, and a beam divergence of approximately 2.5 mr. Diffuser 14 increases the divergence angle of the beam to be approximately 15 mr on one axis, and approximately 36 mr on an orthogonal axis.

Diffuser 14 is positioned at the focal plane of a converging lens 20, which operates as a Fourier lens that collimates diverging beam 18 to a substantially collimated light beam 22. In an embodiment of the present invention, herein also referred to as the green embodiment, wherein source 12 emits green radiation, lens 20 has a focal length of approximately 200 mm. In an alternative embodiment of the present invention, herein also referred to as the ultra-violet (UV) embodiment, wherein source 12 emits UV radiation, lens 20 has a focal length of approximately 300 mm. It will be understood, however, that any other suitable converging lens may be used as lens 20. Light beam 22 is incident on a polarizing beam splitter 52, typically a cube beam splitter, which reflects the beam as an exiting plane polarized coherent light beam 54. Beam 54 traverses a quarter-wave plate 56, which is aligned to rotate the plane of polarization of the beam by 45°, generating a polarization-rotated beam 58.

Beam 58 is incident on a coherence-reducing component 59, comprising an array of transparent optical elements C1, C2, C3, ..., CN, where N is whole number, and the elements are also herein generically termed elements CN. Elements CN are typically produced from substantially the same material, and are cemented together to form component 59. By way of example, component 59 is assumed to comprise five optical elements C1, C2, C3, C4, and C5 which divide beam 58 into five respective sub-beams entering the elements. Elements CN are configured to have parallel front and rear facets, the front facets being anti-reflection coated, the rear facets being coated to be reflecting. Thus, a portion of collimated beam 58 received by each element CN exits the element as a respective collimated sub-beam. Typically, each element CN is configured so that the reflected sub-beams have approximately equal light fluxes.

In one embodiment of the present invention, each element CN is box-shaped, so that each of the element facets is an edge in the shape of a rectangle with height (h) by width (w) dimensions approximately equal to 1 mm×2 mm. In the green embodiment h×w approximately equals 1.5 mm×2 mm; in the UV embodiment h×w approximately equals 1.1 mm×1.5 mm. Except where otherwise stated, the following description assumes that elements CN are box-shaped.

Each box-shaped element of component 59 typically has the same cross-section dimensions, so that a general formula for the dimensions of each of the elements is given by:

$$L_N \times h \times w \quad (1)$$

where $L_N$ is the length of element CN, h is the height of each of the elements, w is the width of each of the elements, where the length, height, and width are orthogonal to each other.

Lengths $L_N$ for each element CN are configured so that at least two elements CN have different lengths. In some embodiments of the present invention, the length difference, $\Delta l_S$, between every two of the elements satisfies the following expression:

$$\Delta l_S \geq \frac{c_L}{2n} \quad (2)$$

where n is a refractive index of the material of elements CN.

The beam entering into elements CN (beam 58) is thus reflected as a group 78 of sub-beams 66, 68, 70, 72, and 74. Group 78 of sub-beams have their polarizations rotated 45° by plate 56, which causes the planes of polarization to be orthogonal to those of beam 54, and group 78 are thus transmitted by beam splitter 52, exiting therefrom as a group 80 of exiting collimated sub-beams. It will be understood that for embodiments wherein expression (2) holds, an optical length difference 2Δl·n between any two sub-beams in group 78 is greater than or equal to the coherence length $c_L$, so that group 80 are incoherent with respect to each other. For embodiments wherein expression (2) does not hold, the difference in lengths of elements CN causes the sub-beams in group 80 to be at least partly incoherent with respect to each other. Thus, elements CN act as a reflection system that converts a substantially collimated coherent beam incident on the elements into a group of exiting at least partially incoherent substantially collimated sub-beams.

Group 80 of sub-beams are incident on a coherence-reducing component 25, comprising an array of transparent optical elements B1, B2, B3, . . . , BN, where N is a whole number, and the elements are also herein generically termed elements BN. Elements BN are typically produced from substantially the same material, and are cemented together to form component 25. By way of example, component 25 is assumed to comprise five optical elements B1, B2, B3, B4, and B5. Elements BN are configured to have parallel front and rear facets, both of which are anti-reflection coated. Lens 20, described above, is positioned so that a back focal plane of the lens lies in a region between elements CN and BN.

In one embodiment of the present invention, each element BN is box-shaped, and except where otherwise stated, the following description assumes that elements BN are box-shaped having dimensions given by equation (1).

Lengths $L_N$ for each element BN are configured so that at least two elements BN have different lengths. In some embodiments of the present invention, the length difference, $\Delta l_l$, between every two elements BN satisfies expression (3):

$$\Delta l_l \geq \frac{c_L}{(n-1)} \cdot Q \qquad (3)$$

where

Q is a number of different optical paths generated by component 59, corresponding to the number of different length elements in the component, and n is a refractive index of the material of elements BN.

Component 25 is oriented so that each of the sub-beams within group 80 is further divided into a portion which traverses the component, and a portion which bypasses the component. Typically, components are oriented so that the heights of component 25 are approximately orthogonal to the heights of component 59. The orientation of component 25 is such that, for each sub-beam within group 80, the portion which traverses the component is divided into further sub-beams.

Each sub-beam of group 80 is thus divided into six further sub-beams, five sub-beams passing through elements BN, and one sub-beam bypassing elements BN. For example, the sub-beam of array 80 generated by sub-beam 66 (from element C1) is separated into a group of six collimated sub-beams. By inspection of section 10, it will be understood that coherence-reducing component 25 and coherence-reducing component 59 function as a combined coherence-reducing component 101. It will be appreciated that 30 substantially collimated sub-beams are generated by component 101, and are output by the component as a group 102 of substantially collimated sub-beams.

In an alternative embodiment of the present invention, expressions (2) and (3) alter to expressions (4) and (5) respectively.

$$\Delta l_S \geq \frac{c_L}{2n} \cdot Q \qquad (4)$$

where

Q is the number of optical paths generated by component 25, corresponding to the number of different length elements in the component plus one.

$$\Delta l_l \geq \frac{c_L}{(n-1)} \qquad (5)$$

By consideration of expressions (2)-(5), it will be understood that the number Q may be applied to determine the lengths of elements of one of the components in a combined coherence reducing component such as component 101. The value of Q, when the other component of the combination is a reflecting component, corresponds to the number of different length elements of the reflecting component. When the other component of the combination is a transmitting component, the value of Q corresponds to the number of different length elements of the transmitting component plus one.

It will be appreciated that in general for section 10, there may be p different length elements in a transmission system formed of elements BN, and q different length elements in a reflection system formed of elements CN, in which case the combined coherence-reducing component outputs (p+1)·q collimated sub-beams.

As stated above, each element BN is a different length, and each element CN is also a different length. If elements CN and BN comply with expressions (2) and (3), or with expressions (4) and (5), then the different element lengths cause each sub-beam in group 102 to be sufficiently optically delayed so that it is incoherent with respect to the other sub-beams of the group. Other pairs of expressions for $\Delta l_s$ and $\Delta l_l$, including expressions which are integral multiples of expressions (2)-(5), and which cause each sub-beam in group 102 to be sufficiently optically delayed so that it is substantially incoherent with respect to the other sub-beams of the group, will be apparent to those skilled in the art. All such expressions are assumed to be comprised within the scope of the present invention.

If elements CN and BN do not comply with such expressions, but their different lengths are chosen so that each sub-beam in group 102 has a different optical delay, then each of the sub-beams in group 102 is typically at least partly incoherent with respect to the other sub-beams of the group.

Group 102 of collimated sub-beams is input to a light combiner 42, which is described in more detail with respect to FIG. 4 below.

In the description above, elements BN and CN have been assumed to be formed from substantially box-shaped elements. These elements generate the required differences in optical path length, while enabling collimated input beams to be output as collimated sub-beams. Other elements having these properties, and that are not box-shaped, are described with respect to FIG. 2.

Figure 2:
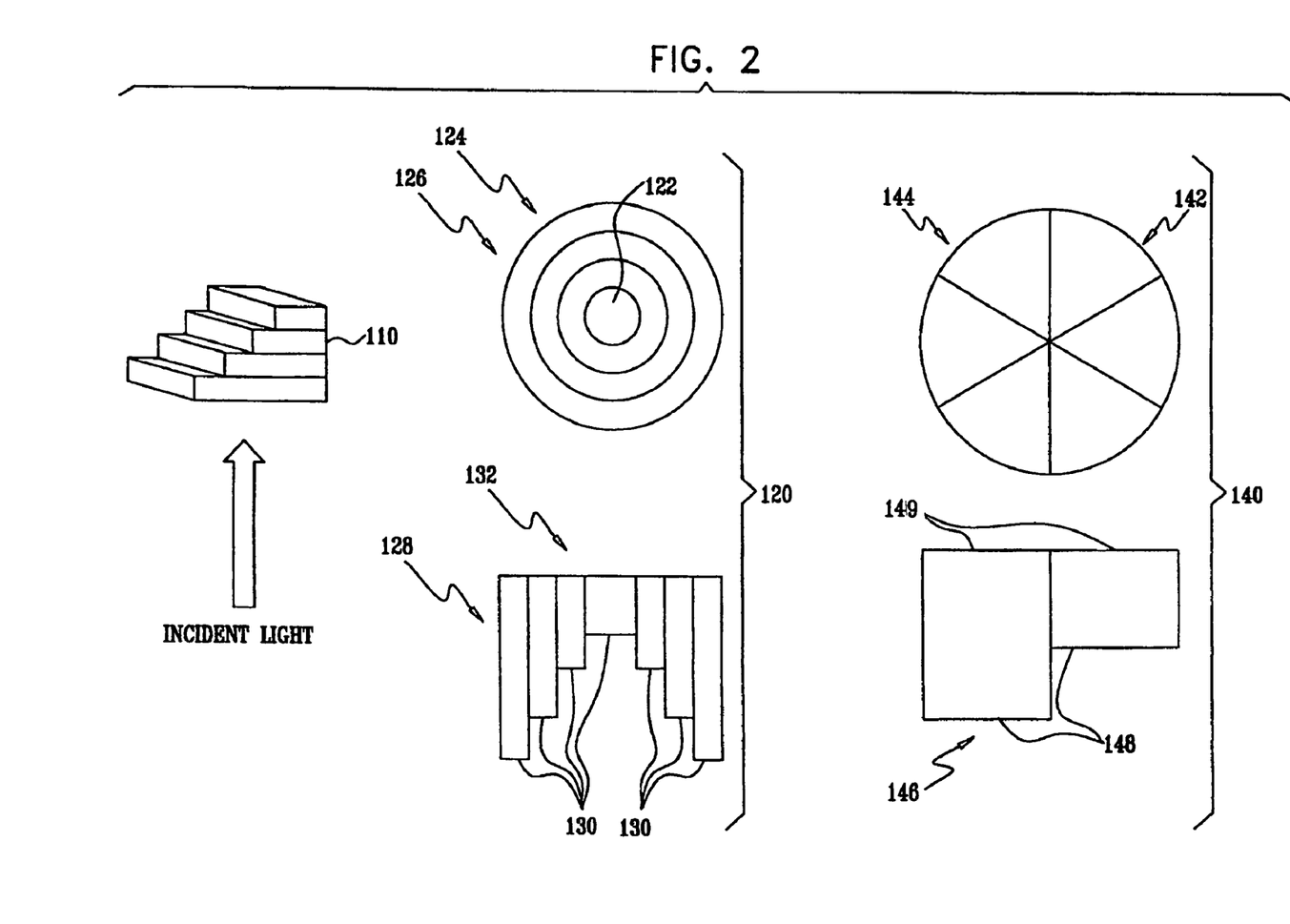
FIG. 2 illustrates examples of arrangements of elements of coherence-reducing components of the speckle reduction apparatus of FIG. 1, according to an embodiment of the present invention.

FIG. 2 illustrates some examples of alternate arrangements for elements of coherence-reducing components such as elements BN and CN, according to an embodiment of the present invention.

An array 110 comprises box-shaped elements, and is generally similar to component 25. Array 110 may be configured as a transmission or as a reflection system. However, array 110 is aligned so that light is incident on the array in a direction normal to a side of the elements of the array, rather than, as in the case of component 25, normal to an edge of the elements. The thickness of each of the box-shaped elements of array 110 may be the same or different, and it will be appreciated that the array divides a beam incident on it into sub-beams having different delays.

An array 120 comprises sections in the form a rod 122 and a plurality of concentric cylinders 124 surrounding the rod.

Array 120 is shown in a top view 126 and a cross-section 128. Array 120 has lower facets 130 and upper facets 132, which are parallel to each other.

An array 140 is shown in a top view 144 and as a cross-section 146. Array 140 comprises a plurality of prisms 142. By way example, array 140 comprises six right prisms, each right prism having a base in the form of a sector of a circle. Array 140 has upper facets 148 and lower facets 149 which are parallel to each other.

Each of arrays 120 and 140 is formed to have its sections different in length from other sections of the array. If the array is configured as a transmission system, upper and lower facets are typically anti-reflection coated. If the array is configured as a reflection system, either the upper or the lower facets are coated to be reflecting.

In an embodiment where arrays 110, 120, or 140 are a transmission system, the paths traversed by the light within the array satisfy expressions (3) and (4). In an alternative embodiment where arrays 110, 120, or 140 are a reflection system the paths traversed by the light satisfy expressions (2) or (5).

Those skilled in the art will be able to formulate other arrays having the same properties as the arrays exemplified herein, i.e., generating different optical path lengths for collimated incident beams so as to output at least partly incoherent collimated sub-beams. For example, such an array may be formed from four box-like components having a common edge, generally similar to array 140. All such arrays are assumed to be comprised within the scope of the present invention.

Returning to FIG. 1, it will be appreciated that section 10 is one example of a system for combining arrays, each array providing multiple optical path lengths, and all the arrays being positioned serially in a path of the collimated beam which is to have its speckle reduced. Other combinations, such as, in section 10, positioning array 120 (FIG. 2) configured as a transmission system in place of elements BN, and array 140 configured as a reflection system in place of elements CN, will be apparent to those skilled in the art. It will also be apparent that the serial combination of such arrays is not limited to two arrays, so that substantially any convenient number of transmission and/or reflection arrays may be arranged in a serial manner. It will be appreciated that a combination of arrays may be configured so that the fluxes of the sub-beams generated by the combination are approximately equal.

Figure 3A:
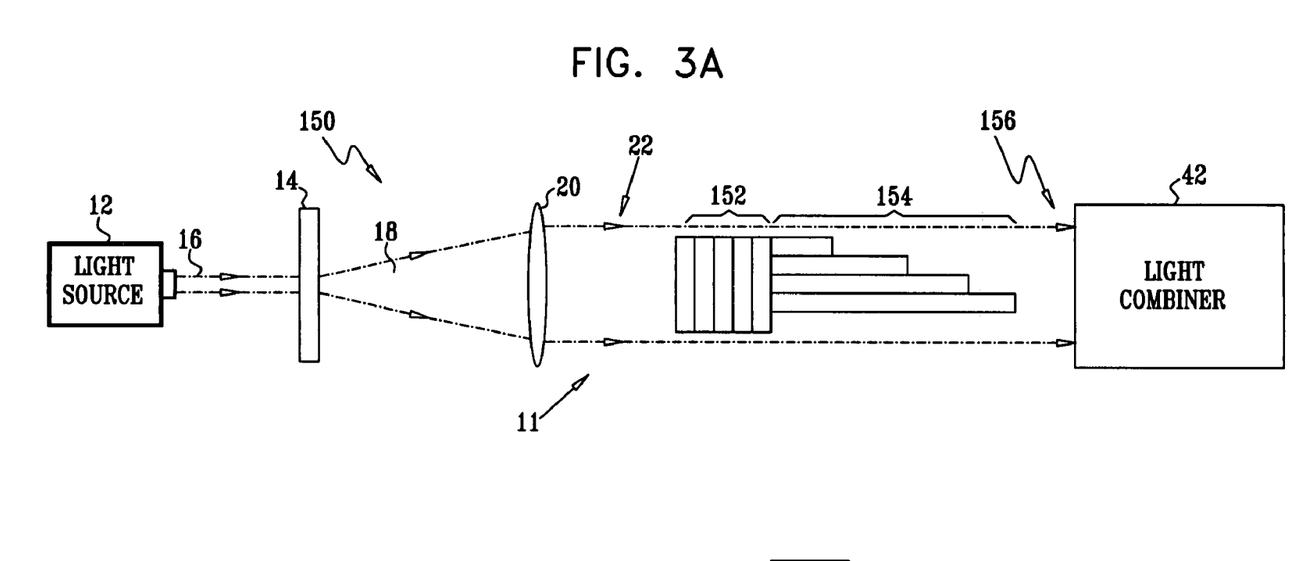
FIG. 3A schematically shows two transmission arrays used in the initial section of FIG. 1.
Figure 3B:
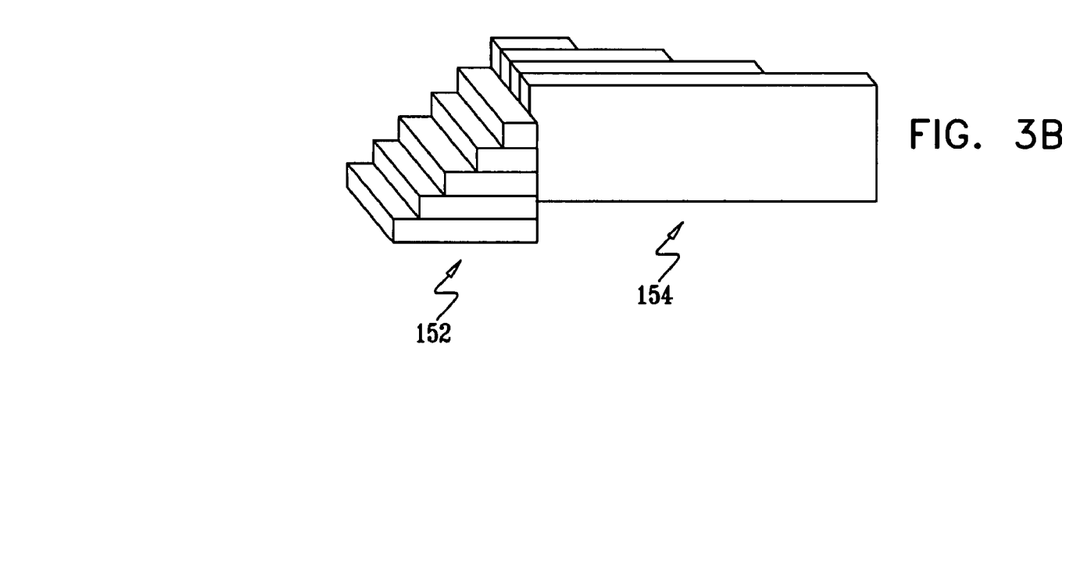
FIG. 3B is a schematic perspective drawing of the two arrays, according to an embodiment of the present invention.

FIG. 3A schematically shows two transmission arrays used in an initial section 150 of apparatus 11, and FIG. 3B is a schematic perspective drawing of the two arrays, according to an embodiment of the present invention. Apart from the differences described below, the operation of section 150 is generally similar to that of section 10 (FIG. 1), such that elements indicated by the same reference numerals in both sections 150 and 10 are generally identical in construction and in operation. For section 150, a value of $c_L$ is assumed to be 1 mm. An array 152, and an array 154, are coupled in series, and are typically positioned in beam 22 so that lens 20 acts as a Fourier lens, i.e., so that edges of elements of array 152 facing the lens are approximately at a focal plane of the lens. Each array 152 and 154 is assumed to comprise box-shaped blocks, of generally the same form as component 25, so that expression (1) applies for each array. Both arrays are assumed to be formed from material having a refractive index n=1.5. As shown in FIG. 3B, the arrays are butted together as well as being offset both vertically and horizontally from each other. This arrangement ensures that different portions of light beam 22 may bypass both arrays, may pass through each one of the blocks singly, or may pass through all possible combinations of a block of array 152 and a block of array 154.

Array 152 comprises five blocks which have lengths SN, where SN represents the length of the $N^{th}$ block of the array in mm. Lengths SN satisfy the condition given by expression (5), so that $$\Delta l_i \geq \frac{1}{1.5-1} = 2.$$

By way of example, lengths S1, S2, S3, S4, and S5 of array 152, that satisfy this condition, are respectively assumed to be 2, 4, 6, 8, and 10 mm.

Array 154 comprises four blocks, which have lengths MN, where MN represents the length of the $N^{th}$ block of the array in mm. Lengths MN satisfy the condition given by expression (3), wherein Q=6 since array 152 is a transmission array that defines six paths for light traversing the array, comprising one path that bypasses the array and five paths passing through the different blocks of the array. Thus, for lengths MN, $$\Delta l_i \geq \frac{1}{(1.5-1)} \cdot 6 = 12.$$

By way of example, lengths M1, M2, M3, and M4 of array 154, that satisfy this condition, are respectively assumed to be 12, 24, 36, and 48 mm.

The six paths defined by array 152 have lengths of optical material given by {0, 2, 4, 6, 8, 10}. Array 154 defines five paths for light traversing the array, comprising one path bypassing the array and four paths passing through the different blocks of the array. The five paths have lengths of optical material given by {0, 12, 24, 36, 48}.

The two arrays in series, comprising a total of 5+4=9 blocks, are arranged with respect to each other so as to generate a group 156 of (5+1)·(4+1)=30 collimated sub-beams entering light combiner 42. Each sub-beam follows a path having a different length of optical material. The lengths of optical material in the 30 different paths are given by a matrix M:

$$M = \begin{pmatrix} 0+0 & 0+2 & 0+4 & 0+6 & 0+8 & 0+10 \\ 12+0 & 12+2 & 12+4 & 12+6 & 12+8 & 12+10 \\ 24+0 & 24+2 & 24+4 & 24+6 & 24+8 & 24+10 \\ 36+0 & 36+2 & 36+4 & 36+6 & 36+8 & 36+10 \\ 48+0 & 48+2 & 48+4 & 48+6 & 48+8 & 48+10 \end{pmatrix} = \begin{pmatrix} 0 & 2 & 4 & 6 & 8 & 10 \\ 12 & 14 & 16 & 18 & 20 & 22 \\ 24 & 26 & 28 & 30 & 32 & 34 \\ 36 & 38 & 40 & 42 & 44 & 46 \\ 48 & 50 & 52 & 54 & 56 & 58 \end{pmatrix} \quad (8)$$

Consideration of the lengths given by matrix M shows that a property of the paths is that each path differs from all other paths by an optical length that is at least sufficient to make the sub-beam in the path incoherent with respect to all others. Those skilled in the art will be able to formulate other values of lengths for arrays such as arrays 152 and 154, wherein the path differences of the combined arrays have the property given above, and all such combined arrays are assumed to be included within the scope of the present invention.

Those skilled in the art will also be able to formulate further values of lengths for arrays such as arrays 152 and 154, wherein a property of the paths of the combined arrays is that each path differs from all other paths by an optical length that makes the sub-beam in the path at least partially incoherent with respect to all others, and all such combined arrays are also assumed to be included within the scope of the present invention.

In one embodiment of the invention, arrays 152 and 154 are configured so that each sub-beam following the different paths with lengths given by matrix M have approximately equal fluxes. Consequently, if beam 22 has an approximately uniform intensity distribution, the arrays are configured so that each sub-beam has approximately the same cross-section. Alternatively, if beam 22 has a non-uniform distribution, the cross-sectional dimensions of blocks of array 152 and/or 154 may be adjusted to alter the cross-sections of the sub-beams, so as to compensate for the non-uniformity.

It will be appreciated that in general for section 150, if a first array of transmission elements has r different length elements, and a second array of transmission elements has s different length elements, the combined coherence-reducing component outputs (r+1)·(s+1) collimated sub-beams.

Figure 4:
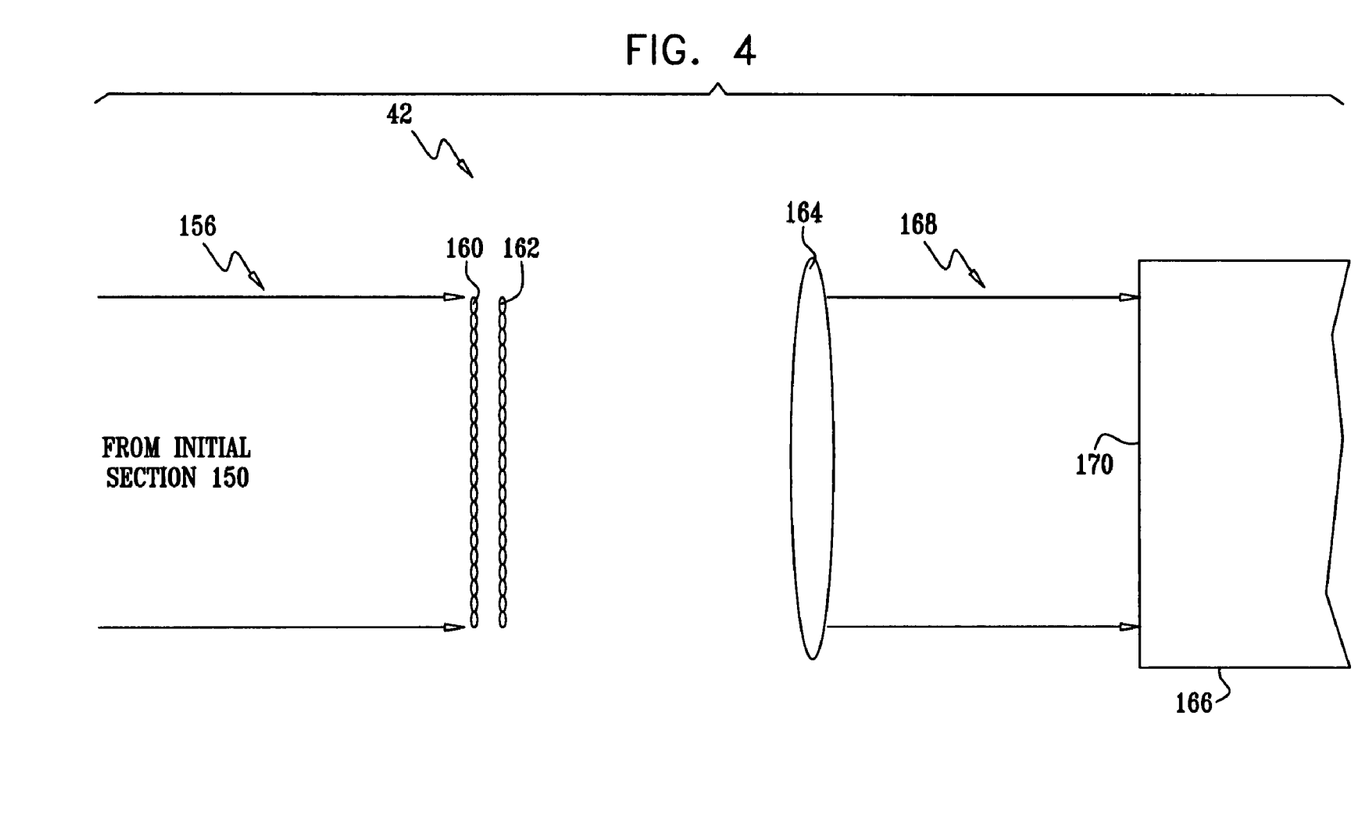
FIG. 4 is a schematic diagram of a light combiner used in the speckle reduction apparatus of FIG. 1, according to an embodiment of the present invention.

FIG. 4 is a schematic diagram of light combiner 42 of apparatus 11, according to an embodiment of the present invention. For purposes of explanation, apparatus 11 is assumed to comprise initial section 150 (FIGS. 3A and 3B) which delivers group 156 of sub-beams to the combiner. Combiner 42 comprises a first converging micro lens array 160 followed by a second converging micro lens array 162 and a Fourier lens 164.

Both arrays 160 and 162 comprise matrices of small lenses, typically arranged as rectangular or hexagonal arrays, each lens having a focal length of approximately 15 mm and a diameter of approximately 0.3 mm. The arrays are typically separated by their focal length. The inventors have found that suitable arrays of lenses are produced by Suss MicroOptics SA of Neuchatel, Switzerland, and have used their CC-Q-300, 0.5° arrays in the green embodiment of the present invention, and their CC-Q-300 1° arrays in the UV embodiment of the present invention. Using these arrays, the configuration of combiner 42 creates a square image comprised of the homogenized apertures of first micro lens array 160.

Converging lens 164 typically has a focal length of approximately 250 mm, and is positioned so that its front focal plane is approximately at the plane of array 162, and so that its back focal plane is approximately at an entrance pupil 170 of a receiving module 166. The configuration of the two arrays with the converging lens acts as a fly's-eye condenser, imaging a homogenized light distribution coming from imaging each element of array 154 (FIGS. 3A and 3B) to pupil 170.

Receiving module 166 thus receives a collimated beam 168 that is at least partially incoherent, being formed from the incoherent sub-beams generated in section 150, so that the beam exhibits virtually no speckle.

It will be appreciated that light combiner 42 is one example of an apparatus that is able to receive a multiplicity of at least partially incoherent collimated sub-beams, homogenize the sub-beams, and generate a collimated output beam from the homogenized sub-beams. Those skilled in the art will be able to formulate other light combiners with these properties, including, but not limited to, combiners using holographic elements, and all such combiners are assumed to be comprised within the scope of the present invention.

It will also be appreciated that while the embodiments described above combine two coherence-reducing components operating in series, there is substantially no limit on the number of such components that may be serially combined. Furthermore, the components of the combination may be either reflection or transmitting components. For example, a combined coherence reducing component may comprise a reflection component followed by a first and a second transmitting component. Consequently, all such combinations of coherence reducing components are assumed to be comprised within the scope of the present invention.

It will be understood that in passage of light through apparatus 11, beam collimation, as well as polarization of the incident beam, may be substantially preserved. Furthermore, components of the apparatus may be chosen so that there is very little energy loss in the components, so that typically there is no damage to the components. It will also be understood that the optical alignment needed for elements of the apparatus is minimal, since the coherence-reducing components are tolerant of misalignment.

Figure 5:
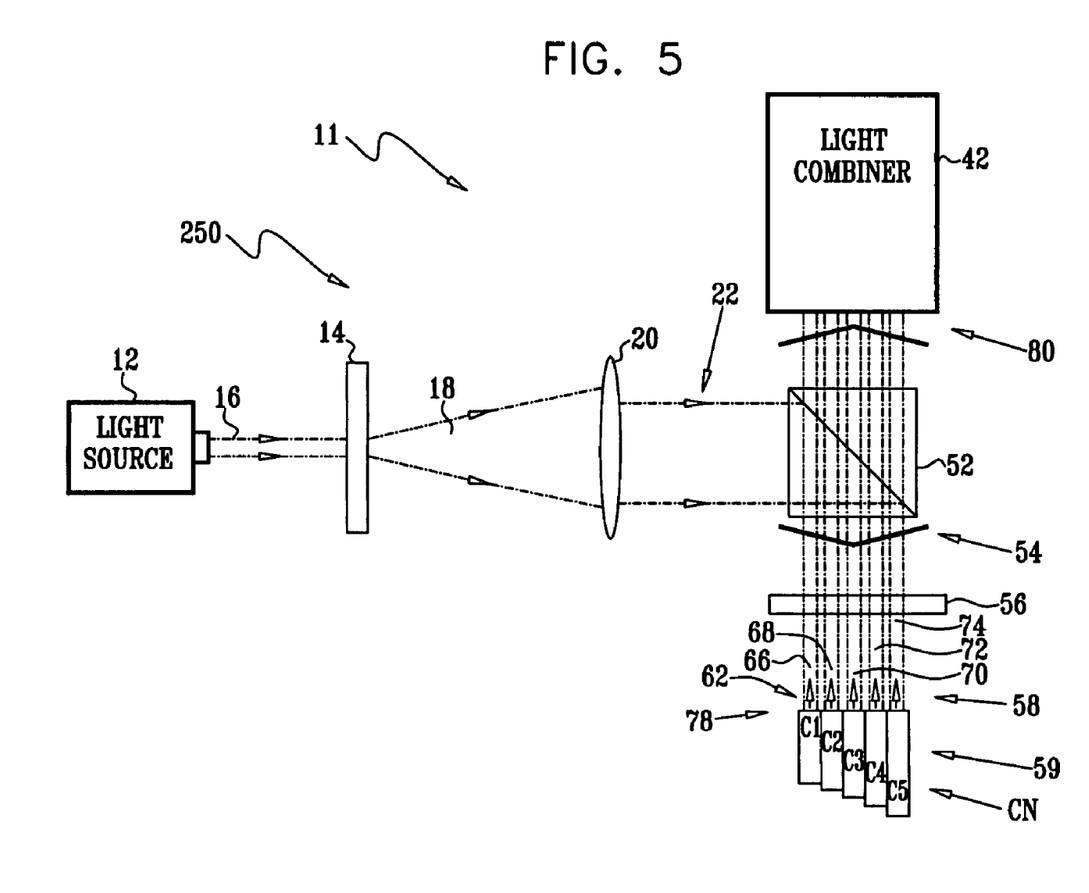
FIG. 5 is a schematic diagram of an alternative initial section of the speckle reduction apparatus of FIG. 1, according to an embodiment of the present invention.

FIG. 5 is a schematic diagram of an initial section 250 of speckle reduction apparatus 11, according to an embodiment of the present invention. Apart from the differences described below, the operation of section 250 is generally similar to that of section 10 (FIG. 1), such that elements indicated by the same reference numerals in both sections 250 and 10 are generally identical in construction and in operation. Rather than having a second coherence-reducing component 25, section 250 has one coherence-reducing array 59, and the substantially collimated sub-beams from array 59 directly enters light combiner 42. Combiner 42 operates as described above with reference to FIG. 4, receiving group 80 of exiting sub-beams at micro-lens array 160.

Figure 6:
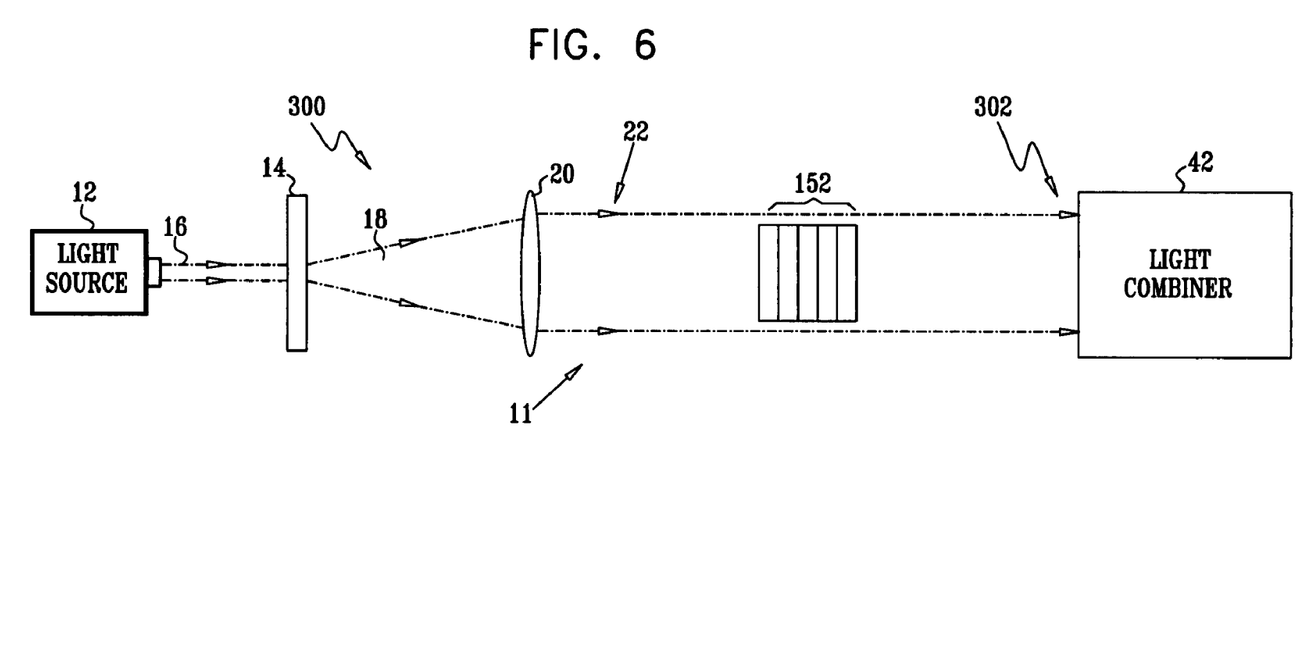
FIG. 6 is a schematic diagram of a further alternative initial section of the speckle reduction apparatus of FIG. 1, according to an embodiment of the present invention.

FIG. 6 is a schematic diagram of an initial section 300 of speckle reduction apparatus 11, according to an embodiment of the present invention. Apart from the differences described below, the operation of section 300 is generally similar to that of section 150 (FIG. 3A), such that elements indicated by the same reference numerals in both sections 300 and 150 are generally identical in construction and in operation. Rather than having a second coherence-reducing component 154, section 300 has one coherence-reducing array 152, and the light from array 152 exits the array as a group 302 of substantially collimated sub-beams. Combiner 42 operates as described above with reference to FIG. 4, receiving group 302 at micro-lens array 160.

Consideration of the description hereinabove shows that embodiments of the present invention may generate sub-beams that are completely incoherent with respect to each other, or at least partly incoherent with respect to each other. Embodiments generating the at least partly incoherent sub-beams may be advantageously used where cost of materials and/or transparency of components are considerations.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. An apparatus for reducing speckle, comprising:
   a first coherence-reducing component, comprising a first array of transparent first elements arranged to receive different, respective first portions of a light beam, the first elements having at least two different optical lengths with respect to the light beam passing therethrough and outputting the respective first portions as respective substantially collimated first sub-beams;

a second coherence-reducing component, comprising a second array of transparent second elements arranged to receive different, respective second portions of each of the first sub-beams, the second elements having at least two different optical lengths with respect to the light beam passing therethrough and outputting the respective second portions as respective substantially collimated second sub-beams; and a light combiner arranged to combine the second substantially collimated sub-beams into a substantially collimated output beam, wherein one or both of the first and second coherence-reducing components further comprises a bypass so as to allow a portion of the light beam to bypass at least one of the first and second coherence-reducing components.

2. The apparatus according to claim 1, wherein the light beam comprises a coherent beam having a coherence length, and wherein two or more of the optical lengths of the first elements differ from one another by at least the coherence length.

3. The apparatus according to claim 1, wherein the light beam comprises a coherent beam having a coherence length, and wherein two or more of the optical lengths generated by the second elements differ from one another by at least the coherence length.

4. The apparatus according to claim 1, further comprising a single mode coherent light source which generates the light beam as a single mode coherent beam.

5. The apparatus according to claim 1, further comprising a multi-mode coherent light source which generates the light beam as a multi-mode coherent beam.

6. The apparatus according to claim 1, wherein the light beam comprises a bypass portion that bypasses at least one of the first and the second coherence-reducing components.

7. The apparatus according to claim 1, wherein the light beam is a coherent beam having a coherence length, and wherein two optical lengths of at least one of the first and second elements differs from one another by at least the coherence length.

8. The apparatus according to claim 1, wherein each of the second substantially collimated sub-beams traverses a respective combined optical path, and wherein the respective optical lengths generated by the first elements and the respective optical lengths generated by the second elements are selected so that the respective combined optical paths are different from each other.

9. The apparatus according to claim 1, wherein at least one of the transparent first and second elements is in the form of a prism having a pair of parallel facets via at least one of which the respective portion of the light beam is conveyed.

10. The apparatus according to claim 9, wherein the prism is a right prism.

11. The apparatus according to claim 10, wherein the right prism comprises a rectangular base.

12. The apparatus according to claim 9, wherein the at least one of the transparent first and second elements comprises a transmission element.

13. The apparatus according to claim 9, wherein the at least one of the transparent first and second elements comprises a reflection element.

14. The apparatus according to claim 1, wherein the first array comprises a number of the first elements, and wherein the at least two different respective optical lengths generated by the second elements are a function of the number.

15. The apparatus according to claim 1, wherein the second array comprises a number of the second elements, and wherein the at least two different respective optical lengths generated by the first elements are a function of the number.

16. The apparatus according to claim 1, wherein the light combiner comprises a multiplicity of lenses which homogenize the collimated output beam.

17. An apparatus for reducing speckle, comprising:
a coherence-reducing component, comprising an array of transparent elements arranged to receive different, respective portions of a light beam that is incident on the component, the elements having at least two different, respective optical lengths with respect to the light beam passing therethrough and outputting the respective portions as respective substantially collimated sub-beams; and a light combiner arranged to combine the substantially collimated sub-beams into a substantially collimated output beams wherein the coherence-reducing component further comprises a bypass so as to allow a portion of the light beam to bypass the coherence-reducing component.

18. The apparatus according to claim 17, wherein the light combiner comprises a multiplicity of lenses which homogenize the collimated output beam.

19. A method for reducing speckle, comprising:
arranging a first coherence-reducing component, comprising a first array of transparent first elements to receive different, respective first portions of a light beam that is incident on the first component, the first elements generating at least two different, respective optical lengths with respect to the light beam passing therethrough;

outputting from the transparent first elements the respective first portions as respective first substantially collimated sub-beams;

arranging a second coherence-reducing component, comprising a second array of transparent second elements to receive different, respective second portions of each of the first substantially collimated sub-beams, the second elements generating at least two different, respective optical lengths with respect to the light beam passing therethrough;

passing a portion of the light beam through a bypass of at least one of the first and second coherence-reducing components;

outputting from the transparent second elements the respective second portions as respective second substantially collimated sub-beams; and arranging a light combiner to combine the second substantially collimated sub-beams into a substantially collimated output beam.

20. The method according to claim 19, wherein the light beam comprises a coherent beam having a coherence length, and wherein two or more of the optical lengths generated by the first elements differ from one another by at least the coherence length.

21. The method according to claim 19, wherein the light beam comprises a coherent beam having a coherence length, and wherein two or more of the optical lengths generated by the second elements differ from one another by at least the coherence length.

22. The method according to claim 19, further comprising generating the light beam as a single mode coherent beam.

23. The method according to claim 19, further comprising generating the light beam as a multi-mode coherent beam.

24. The method according to claim 19, wherein the light beam comprises a bypass portion that bypasses at least one of the first and second coherence-reducing components, and wherein combining the second substantially collimated sub-beams comprises combining the bypass portion with the second substantially collimated sub-beams.

25. The method according to claim 19, wherein the light beam is a coherent beam having a coherence length, and wherein two optical lengths of at least one of the first and second elements differs from one another by at least the coherence length.

26. The method according to claim 19 wherein each of the second substantially collimated sub-beams traverses a respective combined optical path, and wherein the respective optical lengths generated by the first elements and the respective optical lengths generated by the second elements are selected so that the respective combined optical paths are different from each other.

27. The method according to claim 19, wherein at least one of the transparent first and second elements is in the form of a prism having a pair of parallel facets, and comprising conveying the respective portion of the collimated light beam via at least one of the parallel facets.

28. The method according to claim 27, wherein the prism is a right prism.

29. The method according to claim 28, wherein the right prism comprises a rectangular base.

30. The method according to claim 27, wherein the at least one of the transparent first and second elements comprises a transmission element.

31. The method according to claim 27, wherein the at least one of the transparent first and second elements comprises a reflection element.

32. The method according to claim 19, wherein combining the second collimated sub- beams comprises homogenizing the collimated output beam.

33. The method according to claim 19, wherein the first array comprises a number of the first elements, and wherein the different respective optical lengths generated by the second elements are a function of the number.

34. The method according to claim 19, wherein the second array comprises a number of the second elements, and wherein the different respective optical lengths generated by the first elements are a function of the number.

35. A method for reducing speckle, comprising:
arranging a coherence-reducing component, comprising an array of transparent elements to receive different, respective portions of a light beam that is incident on the component, the elements having at least two different, respective optical lengths with respect to the light beam passing therethrough and outputting the respective portions as respective substantially collimated sub-beams;
passing a portion of the light beam through a bypass of the coherence-reducing component; and
arranging a light combiner to combine the substantially collimated sub-beams into a substantially collimated output beam.

36. The method according to claim 35, wherein the light combiner comprises a multiplicity of lenses which homogenize the collimated output beam.

37. An apparatus for reducing speckle, comprising:
a beam diverging component, arranged to uniformly spread out a plurality of modes of a light beam into a diverging beam over a far field plane of the beam diverging component so as to divide each mode of the light beam over a first coherence-reducing component;
a converging lens arranged to collimate the diverging beam into a substantially collimated beam;
the first coherence-reducing component, comprising a first array of transparent first elements arranged to receive different, respective first portions of the substantially collimated beam, the first elements having at least two different optical lengths with respect to the substantially collimated beam passing therethrough and outputting the respective first portions as respective substantially collimated first sub-beams;
a second coherence-reducing component, comprising a second array of transparent second elements arranged to receive different, respective second portions of each of the first sub-beams, the second elements having at least two different optical lengths with respect to the substantially collimated beam passing therethrough and outputting the respective second portions as respective substantially collimated second sub-beams; and
a light combiner arranged to combine the second substantially collimated sub-beams into a substantially collimated output beam,
wherein one or both of the first and second coherence-reducing components further comprises a bypass so as to allow a portion of the light beam to bypass at least one of the first and second coherence-reducing components.

38. The apparatus according to claim 37, wherein the light beam comprises a coherent beam having a coherence length, and wherein two or more of the optical lengths of the first elements differ from one another by at least the coherence length.

39. The apparatus according to claim 37, wherein the light beam comprises a coherent beam having a coherence length, and wherein two or more of the optical lengths generated by the second elements differ from one another by at least the coherence length.

40. The apparatus according to claim 37, further comprising a single mode coherent light source which generates the light beam as a single mode coherent beam.

41. The apparatus according to claim 37, further comprising a multi-mode coherent light source which generates the light beam as a multi-mode coherent beam.

42. The apparatus according to claim 37, wherein the light beam comprises a bypass portion that bypasses at least one of the first and the second coherence-reducing components.

43. The apparatus according to claim 37, wherein the light beam is a coherent beam having a coherence length, and wherein two optical lengths of at least one of the first and second elements differs from another by at least the coherence length.

44. The apparatus according to claim 37, wherein each of the second substantially collimated sub-beams traverses a respective combined optical path, and wherein the respective optical lengths generated by the first elements and the respective optical lengths generated by the second elements are selected so that the respective combined optical paths are different from each other.

45. An apparatus for reducing speckle, comprising:
a beam diverging component, arranged to uniformly spread out a plurality of modes of a light beam into a diverging beam over a far field plane of the beam diverging component so as to divide each mode of the light beam over a coherence-reducing component;
a converging lens arranged to collimate the diverging beam into a substantially collimated beam;
the coherence-reducing component, comprising an array of transparent elements arranged to receive different, respective portions of the substantially collimated beam that is incident on the coherence-reducing component, the elements having at least two different, respective optical lengths with respect to the substantially collimated beam passing therethrough and outputting the respective portions as respective substantially collimated sub-beams; and a light combiner arranged to combine the substantially collimated sub-beams into a substantially collimated output beam, wherein the coherence-reducing component further comprises a bypass so as to allow a portion of the light beam to bypass the coherence-reducing component.

46. A method for reducing speckle, comprising:

arranging a beam diverging component to uniformly spread out a plurality of modes of a light beam into a diverging beam over a far field plane of the beam diverging component so as to divide each mode of the light beam over a first coherence-reducing component;

arranging a converging lens to collimate the diverging beam into a substantially collimated beam;

arranging the first coherence-reducing component, comprising a first array of transparent first elements to receive different, respective first portions of the substantially collimated beam that is incident on the first coherence-reducing component, the first elements generating at least two different, respective optical lengths with respect to the substantially collimated beam passing therethrough; outputting from the transparent first elements the respective first portions as respective first substantially collimated sub-beams;

arranging a second coherence-reducing component, comprising a second array of transparent second elements to receive different, respective second portions of each of the first substantially collimated sub-beams, the second elements generating at least two different, respective optical lengths with respect to the substantially collimated beam passing therethrough;

passing a portion of the light beam through a bypass of at least one of the first and second coherence-reducing components;

outputting from the transparent second elements the respective second portions as respective second substantially collimated sub-beams; and arranging a light combiner to combine the second substantially collimated sub-beams into a substantially collimated output beam.

47. The method according to claim 46, wherein the light beam comprises a coherent beam having a coherence length, and wherein two or more of the optical lengths generated by the first elements differ from one another by at least the coherence length.

48. The method according to claim 46, wherein the light beam comprises a coherent beam having a coherence length, and wherein two or more of the optical lengths generated by the second elements differ from one another by at least the coherence length.

49. The method according to claim 46, further comprising generating the light beam as a single mode coherent beam.

50. The method according to claim 46, further comprising generating the light beam as a multi-mode coherent beam.

51. The method according to claim 46, wherein the light beam comprises a bypass portion that bypasses at least one of the first and the second coherence-reducing components, and wherein combining the second substantially collimated sub-beams comprises combining the bypass portion with the second substantially collimated sub-beams.

52. The method according to claim 46, wherein the light beam is a coherent beam having a coherence length, and wherein two optical lengths of at least one of the first and second elements differs from one another by at least the coherence length.

53. The method according to claim 46, wherein each of the second collimated sub-beams traverses a respective combined optical path, and wherein the respective optical lengths generated by the first elements and the respective optical lengths generated by the second elements are selected so that the respective combined optical paths are different from each other.

54. A method for reducing speckle, comprising:

arranging a beam diverging component to uniformly spread out a plurality of modes of a light beam into a diverging beam over a far field plane of the beam diverging component so as to divide each of the modes over a coherence-reducing component;

arranging a converging lens to collimate the diverging beam into a substantially collimated beam;

arranging the coherence-reducing component, comprising an array of transparent elements to receive different, respective portions of the substantially collimated beam that is incident on the coherence-reducing component, the elements having at least two different, respective optical lengths with respect to the substantially collimated beam passing therethrough and outputting the respective portions as respective substantially collimated sub-beams;

passing a portion of the light beam through a bypass of the coherence-reducing component; and arranging a light combiner to combine the substantially collimated sub-beams into a substantially collimated output beam.

* * * * *